April 16, 1968   R. H. GRABIEL   3,378,020
CONTAINER FOR CONTACT LENSES
Filed April 24, 1967
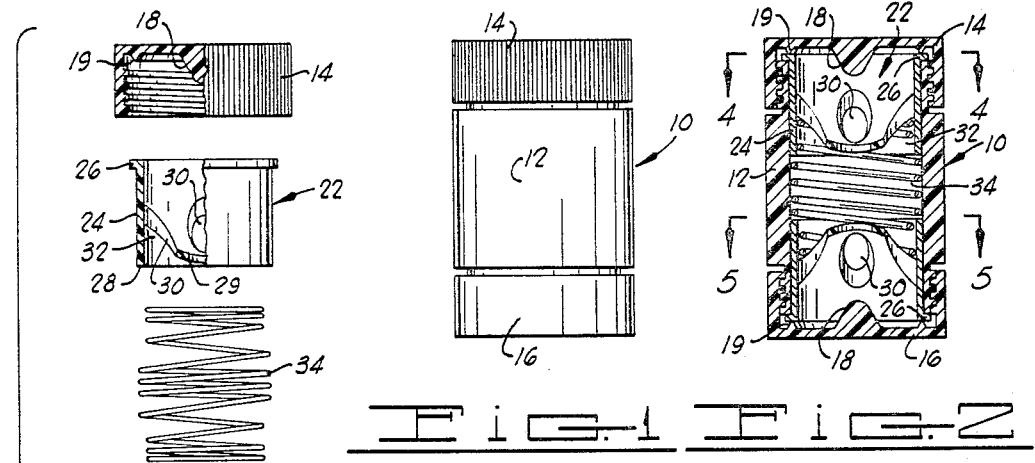
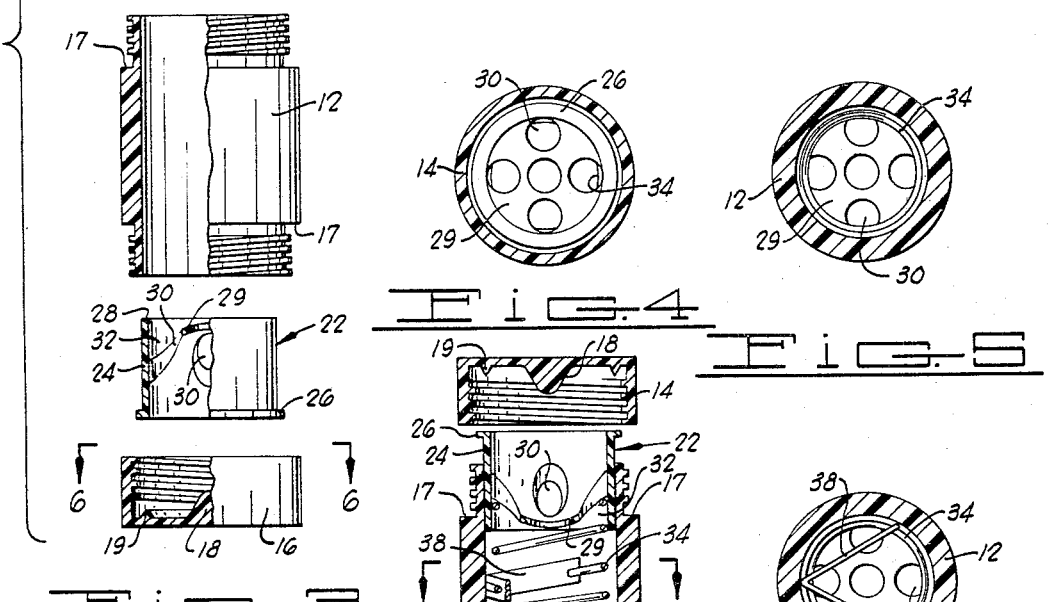
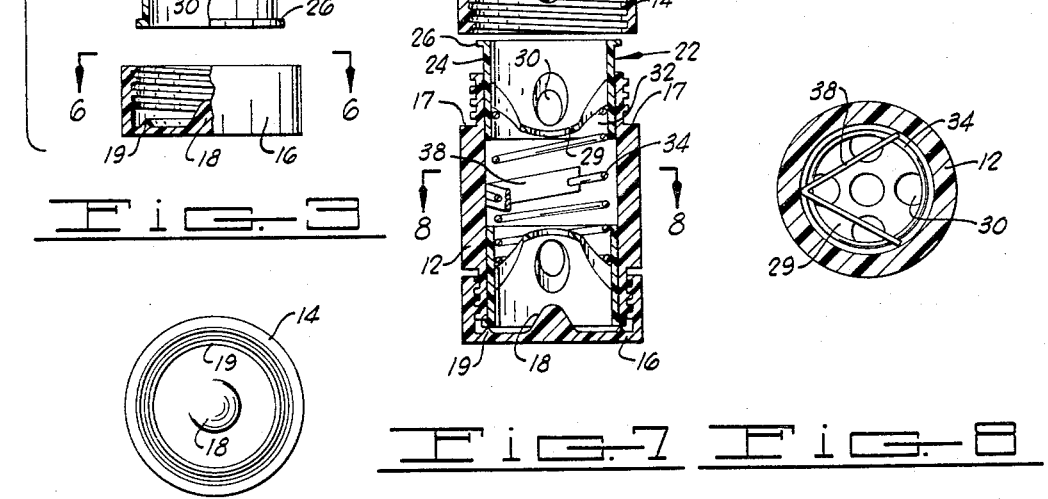
INVENTOR.
RICHARD H. GRABIEL
BY
Dunlap and Laney
ATTORNEYS

United States Patent Office 3,378,020
Patented Apr. 16, 1968

3,378,020
CONTAINER FOR CONTACT LENSES
Richard H. Grabiel, 424 NW. 33rd,
Oklahoma City, Okla. 73118
Continuation-in-part of application Ser. No. 577,358,
Sept. 6, 1966. This application Apr. 24, 1967, Ser.
No. 633,230
7 Claims. (Cl. 134—156)

ABSTRACT OF THE DISCLOSURE

A container for a pair of contact lenses in which a pair of lens baskets are movably positioned in the opposite ends of an open-ended cylindrical body and are biased apart by a spring in the center of the body. A pair of closure caps threadedly engage and close the opposed open ends of the body, forcing the lens baskets toward each other against the bias of the spring. The closure caps and baskets cooperate to tightly seal the body when the closure caps are fully seated.

Background of the invention

*Related prior application.*—This application is a continuation-in-part of my copending application for United States Letters Patent Serial No. 577,358, filed September 6, 1966, now abandoned, and entitled "Container for Contact Lens."

Field of the invention

This invention relates to a container for storing and carrying contact lenses. More particularly, the invention relates to a compact container for carrying left and right contact lenses, which container is constructed in a manner to permit quick and accurate identification of the portion of the container which contains the right contact lens, as distinguished from the portion which contains the left contact lens.

Brief description of the prior art

Corneal contact lenses have been widely accepted and adopted as aids in correcting various defects of vision. Presently, it is estimated that more than two million people in the United States wear such lenses. In almost every case, the focal length and other properties of the lens which is prepared for the right eye will differ in some degree from the comparable properties of the lens prescribed for use in the left eye with the result that the user must be able to distinguish one lens from the other and keep them properly identified during their use.

One type of contact lens user experiences great difficulty in distinguishing the right and left lens by visual identification. This user is the aphakic who has had the crystalline lens removed in the course of cataract surgery. Another group of persons who have a vision defect which does not permit them to clearly distinguish the two lenses visually are hyperopics. These persons are far sighted and cannot focus visually on objects close at hand, and thus have difficulty in maintaining visual identification of the contact lenses when they are brought close to the eye. It will be readily apparent that with persons having vision defective to the extent that they are prevented from making the necessary distinction between lenses, errors in the use of the lenses are quite possible, and the resulting frustration is great.

Lens cases which are presently on the market have removable caps or closures for permitting access to the right and left lens compartments, and frequently these caps are embossed or debossed with the letters R and L to aid in the identification. For persons with certain visual defects, however, these markings may still not be adequate to prevent confusion, and lack of distinction of the right and left lens still often results.

In most of the lens cases now on the market, the cases are intended to contain some type of sterilant or disinfectant liquid when in use. Yet leakage of this liquid from the interior of the case continues to be a problem with many of these cases due to the provision therein of inefficient sealing structures.

Brief description of the invention

This invention relates to a storage container or lens case for retaining contact lenses when they are not in use. The lens case of the invention constitutes an improvement in several respects over any type of lens case which has heretofore been proposed. One of the most significant improvements in the lens case of the invention is that it eliminates or greatly reduces the possibility of erroneously interchanging or mixing the contact lenses in the course of their use by persons who are handicapped by defects of vision which prevent accurate visual distinction. The case also alleviates the possibility of confusion of the lenses by anyone who wears contact lenses, even though their unaided vision is generally adequate to make a distinction between the lenses in normal levels of lighting, or during daylight.

A further advantage of the lens case of the invention is in the construction which permits the lenses to be retained in removable baskets within the case, which baskets are configured to permit the finger of the user to be inserted in the baskets to remove the lenses therefrom by surface tension adherence to the end of the finger. Moreover, the baskets are made so that when the end cap is unscrewed, the basket is raised about ¼-inch, and the lens, adhering to the pad of a finger may be removed for insertion. However, where a long fingernail would prevent the pad of the finger tip from touching the wet lens, the basket containing the lens may be picked up by the lip between the finger and thumb, inverted and raised to the lips of the wearer. The lens is then gently blown onto the palm of the other hand or onto a towel through the perforation in the bottom of the lens basket.

Broadly described, the lens case of the invention comprises a cylindrical body open at the opposite ends thereof and having a pair of closure caps closingly engaging the opposite ends of the cylindrical body with each of these caps having a cylindrical outer peripheral surface which is coaxially related to the outer peripheral surface of the cylindrical body. One of the closure caps is provided on its cylindrical outer peripheral surface with knurling or milling to provide a surface which is rough to the touch, and this cap further is characterized in being red in color. By this means, the aphakic or other persons having a visual defect such that it is impossible to visually distinguish the detail of objects even when they are close at hand, can make a distinction as to the end of the case in which the right lens is located. This distinction is possible due to the response of the rods and cones of the defective eye to the intensity of light transmitted from a red surface as contrasted with that transmitted from a white or plain surface, and also as a result of the ability to identify the end of the case which carries a right lens by touching the milled surface. The user may thus always easily and correctly distinguish that portion of the case which carries the right lens from the remaining portion of the case in which the left lens is located.

A pair of lens baskets constructed of a flexible and resilient material are inserted in each of the open ends of the cylindrical body, and each of the baskets is provided with a peripheral lip of flexible resilient material which extends between one of the closure caps and the respective end of the cylindrical body so as to provide a seal between the closure cap and the body when lenses are stored in the baskets and the closure caps are secured in place. Stated differently, the flexible, resilient lips of the lens baskets act as gaskets between the respective closure caps and the adjacent end of the cylindrical body. A resilient element having opposite ends which bear resiliently against each of the lens baskets is located within the cylindrical body and includes a central portion which frictionally engages the central portion of the interior of the cylindrical body to retain the resilient element in the cylindrical body should both the lens baskets be removed therefrom.

In a preferred embodiment of the invention, the lens baskets each include a generally cylindrical outer side wall which surrounds and is secured to a concave perforated bottom wall. The bottom wall does not extend past the lower terminal edge of the side wall so that when the basket is removed from the cylindrical body and placed upon a horizontal, planar surface, each of the baskets is supported in a stable manner upon the lower edge of its cylindrical side wall, rather than resting upon its concave bottom wall. The configuration of the bottom wall permits an annular groove or recess to be defined between the lowest portion of the bottom wall and the cylindrical side wall, and the preferred embodiment of the invention further contemplates that the resilient element which is employed be constructed as a helical compression spring which has its two end portions seated in the annular groove defined between the bottom wall of each of the baskets and their respective cylindrical side walls.

It is further contemplated, in a preferred embodiment of the invention, that the cylindrical body shall contain a germicidal or bactericidal fluid which continuously bathes each of the contact lenses during their storage by penetration through the perforations in each of the lens baskets. The use of such fluids also makes it possible to remove each lens from its respective basket by surface tension forces which cause the lens to adhere to the tip of the finger of the user when it is inserted into the basket.

I am aware of several prior proposals to construct contact lens cases which possess some similarity to the lens case of the present invention, such as the cases depicted and described in Brown U.S. Patent 3,070,105, Middleton U.S. Patent 3,072,132, Watson U.S. Patent 3,101,087 and Nickell U.S. Patent 3,054,412. The lens case of this invention, however, possesses a number of advantages over those depicted and described in these cited patents, particularly in the construction which permits the tactile sense of the aphakic to be used conjunctively with his ability to distinguish colors for preventing a mixup in lens identification during the use of the lens container. The lens case of this invention also is superior to those of the prior art in its susceptibility to proper use by a color blind person. Advantages also reside in the particular construction of the resilient element used for biasing the lens baskets outwardly, and the particular shape of the lens baskets which permit them to be easily rested upon a planar surface without the risk of their being overturned, and the lens thereby lost or damaged. Moreover, the novel sealing structure which is provided for retaining a germicidal fluid in the cylindrical body also is unique in the art.

From the foregoing description of the invention, it will have become apparent that a major object of the invention is to provide an improved lens case or container for contact lens storage, which lens case is economical to construct, provides by its construction an invaluable aid to an aphakic in the proper use of contact lenses, and which is sufficiently economical to construct and durable in its service life that it can be manufactured and sold for a relatively small monetary amount, and can be used for an indefinite period of time.

A further object of the invention is to provide a contact lens case or container in which a sterilizing liquid can be constantly retained in a position to wet the contact lenses carried in the container at all times during their storage therein.

Another object of the invention is to provide a contact lens container in which the lenses are retained in baskets which are configured and constructed so as to permit the finger of the lens user to be inserted in the baskets for the purpose of removing the lenses therefrom by surface tension adherence of the lens to the end of the finger.

An additional object of the invention is to provide a contact lens case which is provided with a pair of baskets quickly removable from the case, and which are constructed so as to permit them to be stably supported on a horizontal, monoplanar surface.

An additional object of the invention is to provide a contact lens storage case which enables color blind persons to use the case without confusing the lenses provided for the right and left eyes.

In addition to the foregoing described objects and advantages, additional objects and advantages will become apparent as the following detailed description is read in conjunction with the accompanying drawings which illustrate my invention.

Brief description of the drawings

FIG. 1 is a view in elevation of the contact lens case of the present invention as it appears when both of the closure caps are secured in place.

FIG. 2 is a vertical sectional view taken through the center of the lens case, and depicting the internal construction thereof.

FIG. 3 is an exploded view partially in section and partially in elevation and illustrating the appearance of the lens case when it is completely disassembled.

FIG. 4 is a sectional view taken along line 4—4 of FIG. 2.

FIG. 5 is a sectional view taken along line 5—5 of FIG. 2.

FIG. 6 is a view in elevation of one of the end caps utilized on the contact lens case of the invention, as the cap appears when viewed from the inside thereof, and depicting the structure employed on the cap to prevent the undesirable adherance of a lens thereto, and to cooperate with the flexible, resilient lips of the lens baskets to establish a tight seal preventing the escape of a germicidal liquid from the interior of the container.

FIGURE 7 is a vertical sectional view taken through the center of a modified embodiment of the invention and showing one of the closure caps removed.

FIGURE 8 is a section taken on line 8—8 of FIGURE 7.

Description of preferred embodiments

Referring initially to FIG. 1 of the drawing, the lens case of the invention is designated generally by the reference character 10 and includes a tubular and preferably cylindrical body 12 which, in the illustrated embodiment, is threadedly engaged by a pair of closure caps 14 and 16 secured to the open opposite ends of the cylindrical body. The caps 14 and 16 and the cylindrical body 12 carry cooperating buttress threads which function in establishing a tight, high integrity liquid seal as hereinafter described. Each of the closure caps 14 and 16 has an outer peripheral surface which is coaxially related to the cylindrical outer peripheral surface of the cylindrical body 12. As shown in FIG. 1, the closure cap 14 is provided on its outer peripheral surface with milling which provides a rough or uneven surface which can be easily detected by the sense of touch. The closure cap 14 also is coated with, or contains, a material having a relatively high reflectivity for electromagnetic radiation having a wave length corresponding to red light in the visible spectrum. This can, for example, be suitably accomplished by painting the cap red or constructing it of red plastic. The cap 16 has a smooth cylindrical outer peripheral surface and preferably reflects all wave lengths in the visible spectrum equally well, and thus has no perceptible color.

It will further be noted in referring to FIGS. 2 and 3 that the opposite ends of the cylindrical body 12 are peripherally relieved to provide endwardly facing shoulders 17, with the inset ends of the cylindrical body being externally threaded with the buttress threads to receive the closure caps 14 and 16. The construction employed is such that the outer peripheral surfaces of the closure caps 14 and 16 are flush, or in registry, with the cylindrical outer peripheral surface of the cylindrical body 12.

In referring to FIGS. 2 and 6, it will be noted that each of the closure caps 14 and 16 is provided with a centrally located pointed protuberance or post 18, which may conveniently be formed integrally with the respective caps. The posts 18 formed on the inside of the closure caps 14 and 16 prevent adherence through surface tension of the wet contact lenses to the interior surface of the closure caps. There is also provided on the inside surface of each of the closure caps 14 and 16, an annular rib or ridge 19 which tapers to a point at its lower edge and is positioned in alignment with a resilient lip or flange carried by lens baskets as hereinafter described. The annular rib 19 functions to bear against, and sealingly engage the respective resilient sealing lip or flange carried by the lens basket employed in the lens case also as hereinafter described.

Another characteristic of the closure caps 14 and 16 which will be perceived in referring to FIG. 2 is the dimension of the outer peripheral cylindrical surface as measured in an axial direction or along the length of the cylindrical body 12. This dimension is such that the edge of the peripheral cylindrical surface of each of the closure caps will be spaced very slightly from the respective inwardly facing shoulder 17 of the cylindrical body. The spacing is provided to permit a sealing flange or lip formed on the lens receiving baskets of the container (hereinafter described) to be compressed between the closure cap annular rib 19 and the respective end of the cylindrical body at such time as the closure cap is fully seated. This feature of the lens case will be explained in greater detail hereinafter.

Slidingly positioned in each end of the cylindrical body 12 of the lens case 10 is a lens retaining basket designated generally by reference character 22 and depicted most clearly in the exploded view of FIG. 3. Each of the lens baskets 22 has generally cylindrical side wall 24 which is provided at its upper end with a radially outwardly directed sealing lip or flange 26, and which has a lower edge 28 formed in a plane extending normal to the axis of the cylindrical side wall to adapt the basket for being stably supported by this lower edge on a flat monoplanar surface. The sealing lip or flange 26 of each lens basket is preferably constructed of a material which is softer and more resilient than the material of which either the cylindrical body 12 or the closure caps 14 and 16 is constructed to enable the lip to better function as a sealing gasket as hereinafter described. Each of the lens baskets 22 is further characterized in having a concavely curved bottom 29 which is provided with a plurality of holes or perforations 30 for a purpose hereinafter described. It will be noted in referring to FIGS. 2 and 3 and that the concave bottom 29 of each lens basket 22 terminates short of, or above, the lower edge 28 of the cylindrical side wall 24 of the basket. The concave bottom 29 thus does not interfere with the stable support afforded by the lower edge 28 of the basket.

It will further be noted in observing the construction of the lens basket 22 that the configuration of the concave bottom 29, in conjunction with the manner of attachment of the bottom to the cylindrical side wall 24, provide an upwardly tapering annular groove or recess 32 between the bottom and the side wall. A function of the annular groove 32 which is provided in each of the lens baskets 22 is to receive one end of a helical compression spring 34 in the manner best illustrated in FIG. 2. The helical compression spring 34 is of sufficient length that when the lens baskets 22 are slidingly positioned within their respective ends of the cylindrical body 12, the helical compression spring 34 is placed in compression by deformation from its relaxed or uncompressed status illustrated in the exploded view of FIG. 3. It will further be observed in referring to both FIGS. 2 and 3 that the central or medial convolutions of the helical compression spring 23 are of slightly larger diameter than the convolutions at each end thereof so that this central portion of the spring frictionally engages the internal wall of the cylindrical body 12 of the lens case 10. The reason for this configuration of the spring 34 will be subsequently explained.

Although it is not essential to the operation and use of the invention, a desirable construction of the lens baskets 22 contemplates that one of the baskets be constructed of a red material or carry a coating of red paint. This permits the color association of red with the right lens to be carried through all phases of use of the case.

*Operation and use*

In the use of the lens case 10 of the invention a pair of contact lenses are placed in the lens baskets 22 preparatory to storing the lenses in the lens case. This may be accomplished while the lens baskets 22 are stably supported upon a flat surface. Unless one of the lens baskets 22 is colored red, it is immaterial at this point in the use of the lens case 10 which of the two lens baskets 22 receives the right lens and which receives the left lens. The user should, however, keep in mind which of the baskets has received the right lens. Next, one of the baskets is slipped into an open end of the cylindrical body 12 with the perforated bottom 29 thereof facing inwardly, and the sealing flange 26 on the outside of the body. If the basket which has been positioned in the cylindrical body 12 is that basket which contains the right lens, the user then threadedly engages the milled, red closure cap 14 with that end of the cylindrical body 12 in which the basket has been inserted. An association between the right lens and this particular closure cap 14 is established early in the use of the lens case 10 of the invention by the rough, milled cylindrical peripheral surface of this cap, and also by its red color, it being a simple matter for any user, even small children, to associate the redness and roughness of this closure cap with the right lens which is to be stored in the end of the lens case 10 closed by this cap. Once one of the baskets containing either the right lens or the left lens has been placed in the cylindrical body 12, and the associated closure cap 14 and 16 threadedly engaged with that end of the cylindrical body, the lens case 10 is inverted and a suitable germicidal or bactericidal liquid is poured into the opposite end of the cylindrical body 12 to a level which is somewhere between about ½ and ¾ full. Following the location of the desired liquid material within the lens case 10, the lens basket 22 which contains the other lens is placed in the remaining open end of the cylindrical body 12, and then the remaining closure cap 14 or 16 is screwed into position.

When the baskets 22 containing the contact lenses have been placed within the cylindrical body 12 and the closure caps 14 and 16 screwed on the ends of the cylindrical body to the limit of their permissible travel, the thin flexible and resilient sealing flange or lip 26 on each of the lens baskets 22 will be placed in compression between the annular rib 19 carried by the respective lens cap and the adjacent end edge of the cylindrical body. This feature of the invention provides a liquid tight seal at this point, preventing loss of the bactericidal liquid from the lens case while the lenses are stored therein and the case is being carried around by the user. The buttress thread construction affords a back-up or secondary seal further assuring against leakage of the germicidal liquid.

It will be noted in referring to FIG. 2 that with the closure caps 14 and 16 in place, a liquid contained within the cylindrical body 12 can freely pass through the perforations 30 in the concave bottom 29 of each of the lens baskets 22 and thus thoroughly wet and clean the surfaces of the contact lenses contained therein and maintain them in a sterile condition.

When the lens user desires to remove the lenses from the lens case 10 for insertion in the eyes, this can be readily and easily accomplished, through the user be an aphakic or other person experiencing difficulty in distinguishing the detail of objects located at close range and also even in the eventuality that the user is afflicted with color blindness. Initially, the lens case 10 is viewed and felt, and that end thereof which contains the contact lens for the right eye will be easily determined by the red, rough and right association hereinbefore described. The user can thus remove either of the closure caps 14 and 16 with a certain knowledge of whether the lens contained within the basket 22 adjacent such end cap is either the right or left lens, depending upon the association of the closure cap characteristics with a particular one of the lenses.

When either of the closure caps 14 or 16 are removed from the lens case 10, the adjacent lens basket 22 is biased resiliently upwardly from its storage position as shown in FIG. 2 to an extended position in which a substantial portion of the side wall 24 of the basket extends beyond the open end of the cylindrical body 12. This extended position is shown in FIGURE 7 of the drawings. This permits the user to easily grasp the lip or flange 26 carried on the exposed end of the lens basket 22 and slide it from the cylindrical body 12 and place it upon a table top or other flat monoplanar surface if this should be desired. Alternately, the lens basket 22 may be permitted to remain in its semi-seated position within the cylindrical body 12 while the user removes the lens therefrom by the use of a finger if this procedure should be desired. In any event, in whichever of the procedures is employed, each of the lens baskets 22 is dimensioned so that persons using the case may, without difficulty, insert the index or forefinger into the basket in a manner which will cause the wetted contact lens contained therein to adhere by surface tension to the end of the finger. In the case of women having fingernails of a length such that the lens cannot be reached by the tip of the finger when the finger is inserted in the basket, the basket can be removed from the cylindrical body, inverted, raised to the lips for gently blowing through the perforations 30 in the bottom 29 of the basket to force the lens into the palm of the hand or onto a towel on a table.

In some instances, it may be desirable to remove both of the lens baskets 22 simultaneously. In this eventuality, the same procedure is employed as is used for removal of one of the lens baskets while retaining the other in place. An important characteristic of the lens case 10 of the invention is the frictional engagement of the helical compression spring 34 with the internal wall of the cylindrical body 12. This feature assures that the compression spring 34 will not be lost from the lens case 10 when either or both baskets 22 are removed therefrom, or under any other conditions of use.

A modified embodiment of the invention is depicted in FIGURES 7 and 8, and differs from the FIGURES 1–6 embodiment only in the provision of a spring retaining element 38. The spring retaining element 38 is of V-shaped configuration and is dimensioned so that the free end of each leg and also the apex of the retaining element bear against the side walls of the cylindrical body 12. A small slot is provided in the apex and in the free end of each leg of the retaining element to accommodate convolutions of the spring 34. The spring retaining element 38 is made of a resilient material and is resiliently deformed when placed in position in the central portion of the cylindrical body 12. The function of the retaining element 38 is to provide an alternate means for anchoring the spring in the cylindrical body.

From the foregoing description of the invention it will have become apparent that the present invention provides an improved lens case which can be easily used not merely by contact lens users having minor or relatively serious vision defects, but also by those persons who have defects of vision which prevent the distinction of detail even in objects positioned relatively close to the eyes. The lens case can be economically constructed, can be quickly and easily used, and poses minimum risk of loss of the valuable contact lenses which are stored therein.

Although preferred embodiments of the invention have been depicted in the accompanying drawings and herein described, it is to be understood that various modifications and changes can be made in each exemplary embodiment presented without departure from the basic principles which underlie the invention. All such minor modifications and changes which do not depart from these principles are therefore deemed to be circumscribed by the spirit and scope of the inventon except as the same may be necessarily limited by the appended claims or reasonable equivalents thereof.

I claim:

1. A contact lens case comprising:
   a tubular body open at the opposite ends thereof;
   a pair of closure caps engaging the opposite ends of said tubular body, one of said closure caps having a smooth exterior surface formed of a material having equally good reflectance for visible light of all wave lengths and the other of said closure caps having a roughened surface and including a material having a high reflectance for electromagnetic radiation of the wave length of red visible light whereby an aphakic lens wearer can clearly distinguish one of said closure caps from the other;
   a pair of lens baskets slidably positioned in each end of said tubular body and freely removable therefrom upon disengagement of said closure caps from said body, each of said lens baskets including
      a generally cylindrical outer side wall;
      an annular resilient sealing lip secured to the outer side wall at one end thereof and extending around said side wall and between said tubular body and the respective closure cap nearest the respective basket, said sealing lip being constructed of a softer, more resilient material than said tubular body and closure caps for forming a sealing gasket between said closure caps and tubular body;
   a perforated bottom wall secured inside said cylindrical side wall and positioned entirely between the ends of said cylindrical side wall;
   said perforated bottom wall of each of said lens baskets being concave in configuraton and defining an annular groove with said cylindrical outer side wall;
   a resilient member positioned in said tubular body between said lens baskets and having a pair of opposed ends bearing against the lens baskets, and resiliently biasing the lens baskets toward the open ends of said tubular body, and further having a central portion frictionally engaging the central interior portion of said tubular body at a location between said lens baskets;
   and said resilient member being a helical compression spring having a teminal convolution at each end thereof, each of said terminal convolutions being positioned in the annular groove of one of the lens baskets.

2. A contact lens case as defined in claim 1 wherein said tubular body and both closure caps are cylindrical in configuration and have the same outside diameter.

3. A contact lens case as defined in claim 1 wherein each of said closure caps includes a centrally disposed, pointed protuberance extending therefrom into the adjacent lens basket.

4. A contact lens case as defined in claim 3 wherein said closure caps and tubular body are engaged by buttress threads, and are dimensioned so that the sole limitation to threaded movement of the closure caps onto said tubular body is afforded by contact of the annular ribs on said closure caps with the resilient sealing lips of the lens baskets.

5. A contact lens case as defined in claim 1 and further characterized to include a germicidal liquid located in said tubular body between said closure caps.

6. A contact lens case as defined in claim 1 wherein said resilient member comprises a helical compression spring, and further characterized to include a V-shaped spring retaining element having its apex and the free ends of its legs frictionally engaging said central interior portion of said tubular body, said spring retaining element engaging the central convolutions of said helical compression spring.

7. A contact lens case as defined in claim 1 wherein each of said closure caps further includes an annular rib tapering to a sharpened lower edge, and aligned with, and bearing sealingly against, the annular resilient sealing lip of the adjacent lens basket; said sealing lip being positioned between said annular rib to said tubular body.

References Cited
UNITED STATES PATENTS

| | | | |
|---|---|---|---|
| 3,054,412 | 9/1962 | Nickell | 134—137 |
| 3,070,105 | 12/1962 | Brown | 134—156 |
| 3,072,132 | 1/1963 | Middleton | 134—137 |

CHARLES A. WILLMUTH, *Primary Examiner.*

ROBERT L. BLEUTGE, *Examiner.*